United States Patent
Song et al.

(10) Patent No.: US 11,772,264 B2
(45) Date of Patent: Oct. 3, 2023

(54) NEURAL NETWORK ADAPTIVE TRACKING CONTROL METHOD FOR JOINT ROBOTS

(71) Applicant: Dibi (Chongqing) Intelligent Technology Research Institute Co., Ltd., Chongqing (CN)

(72) Inventors: Yongduan Song, Chongqing (CN); Huan Liu, Chongqing (CN); Junfeng Lai, Chongqing (CN); Ziqiang Jiang, Chongqing (CN); Jie Zhang, Chongqing (CN); Huan Chen, Chongqing (CN); Li Huang, Chongqing (CN); Congyi Zhang, Chongqing (CN); Yingrui Chen, Chongqing (CN); Yating Yang, Chongqing (CN); Chunxu Ren, Chongqing (CN); Han Bao, Chongqing (CN); Kuilong Yang, Chongqing (CN); Ge Song, Chongqing (CN); Bowen Zhang, Chongqing (CN); Hong Long, Chongqing (CN)

(73) Assignee: Dibi (Chongqing) Intelligent Technology Research Institute Co., Ltd., Chongqing (CN)

(*) Notice: Subject to any disclaimer, the term of this patent is extended or adjusted under 35 U.S.C. 154(b) by 253 days.

(21) Appl. No.: 17/210,688

(22) Filed: Mar. 24, 2021

(65) Prior Publication Data
US 2022/0152817 A1 May 19, 2022

(30) Foreign Application Priority Data

Nov. 18, 2020 (CN) .......................... 202011291749.8
Nov. 18, 2020 (CN) .......................... 202011294308.3

(51) Int. Cl.
*B25J 9/16* (2006.01)
*G05B 6/02* (2006.01)
*G05B 13/02* (2006.01)

(52) U.S. Cl.
CPC .............. *B25J 9/163* (2013.01); *B25J 9/161* (2013.01); *G05B 6/02* (2013.01); *G05B 13/027* (2013.01)

(58) Field of Classification Search
CPC .. B25J 9/163; B25J 9/161; G05B 6/02; G05B 13/027; G05B 2219/39271; G05B 2219/42042
See application file for complete search history.

(56) References Cited

U.S. PATENT DOCUMENTS

| 2021/0339390 A1* | 11/2021 | Gaschler | ................. B25J 9/1664 |
| 2021/0347047 A1* | 11/2021 | Bandari | ................... B25J 9/163 |

FOREIGN PATENT DOCUMENTS

| CN | 108818541 A | * | 11/2018 | ............... B25J 13/00 |
| CN | 109483542 A | * | 3/2019 | ............ B25J 9/1605 |
| KR | 20200097982 A | * | 8/2020 | |

OTHER PUBLICATIONS

Yang J. et al., Adaptive Neural Tracking Control of Robotic Manipulators with Guaranteed NN Weight Convergence 2018, Hindawi, pp. 1-11.*

* cited by examiner

*Primary Examiner* — Adam R Mott
*Assistant Examiner* — Sagar Kc
(74) *Attorney, Agent, or Firm* — Dorsey & Whitney LLP

(57) ABSTRACT

The present disclosure discloses a neural network adaptive tracking control method for joint robots, which proposes two schemes: robust adaptive control and neural adaptive control, comprising the following steps: 1) establishing a joint robot system model; 2) establishing a state space expression
(Continued)

and an error definition when taking into consideration both the drive failure and actuator saturation of the joint robot system; 3) designing a PID controller and updating algorithms of the joint robot system; and 4) using the designed PID controller and updating algorithms to realize the control of the trajectory motion of the joint robot. The present disclosure may solve the following technical problems at the same time: the drive saturation and coupling effect in the joint system, processing parameter uncertainty and non-parametric uncertainty, execution failure handling during the system operation, compensation for non-vanishing interference, and the like.

1 Claim, 4 Drawing Sheets

NEURAL NETWORK ADAPTIVE TRACKING CONTROL METHOD FOR JOINT ROBOTS

TECHNICAL FIELD

The present disclosure relates to the technical field of joint robot system control which is highly nonlinear and influenced by external interference and uncertainty, in particular to the joint position tracking control of a rigid arm robot.

BACKGROUND

With the continuous progress of social science and technology, intelligent robots play an increasingly important role, which can complete various tasks instead of human beings in many complex situations.

However, we have never stopped studying the improvement of robot system performance. To be more dexterous and adaptive, the robot system must achieve control algorithms that are simpler in structure, more specialized and more powerful.

Early contributions to the development of joint robot system control schemes included those based entirely or partially on system models provided with feedforward compensation and nonlinear feedback techniques. Generally, however, the joint robot system is highly nonlinear in nature, a corresponding dynamic model for which is difficult to obtain accurately due to external interference and uncertainty.

SUMMARY

For this purpose, the present disclosure aims at proposing a neural network adaptive tracking control method for joint robots to solve the joint tracking control problem of a joint robot system troubled with declining and drive saturation, and to achieve the ideal tracking control.

In order to achieve the above purpose, the present disclosure provides the following scheme:

A neural network adaptive tracking control method for joint robots, which includes the following steps:

1) Establishing a joint robot system model:

$$D_q(q)\ddot{q} + C_q(q,\dot{q})\dot{q} + G_q(q) + \tau(\dot{q},t) = u_a$$

In the model mentioned above, $q$ represents a position vector of the joint robot, $\dot{q}$ represents a velocity vector of the joint robot, $\ddot{q}$ represents an acceleration vector of the joint robot action, $u_a$ represents a control input of the joint robot system, the system parameter $D_q(q)$ represents an inertia matrix of the joint robot system, the system parameter $C_q(q,\dot{q})$ represents a centrifugal matrix of the joint robot system, the system parameter $G_q(q)$ represents a universal gravitation matrix of the joint robot system, and the system parameter $\tau(\dot{q},t)$ represents uncertainty and interference factors of the joint robot system;

2) Establishing a state space expression and an error definition when taking into consideration both the drive failure and actuator saturation of the joint robot system:

$$u_a(t) = \rho(t)[\Gamma(0) + L(\xi)v + \varepsilon(v)] + \varepsilon(t) = \rho(t)L(\xi)v + [\rho(t)\Gamma(0) + \rho(t)\varepsilon(v) + \varepsilon(t)]$$

$$e = x_1 - q^*$$

$$\ddot{e} = \ddot{x}_1 - \ddot{q}^* = D_q^{-1}(q)\rho(t)L(\xi)v + D_q^{-1}(q)[\rho(t)\Gamma(0) + \rho(t)\varepsilon(v) + \varepsilon(t)] + F(\bullet) + Q(x_1,t) - \ddot{q}^*$$

In the above formulas, $u_a(t)$ represents a system control input signal considering both drive failure and actuator saturation, $\Gamma(0) + L(\xi)v + \varepsilon(v)$, represents a control signal in the case of actuator saturation, wherein $v$ represents an actual controller design quantity of the system, $\Gamma(0) + L(\xi)v$ represents a smooth function proposed according to the mean value theorem of $v$, $\Gamma(0)$ is a bounded matrix, $L(\xi)$ is a non-negative positive definite matrix, $\varepsilon(v)$ is a bounded approximate error and represents an uncertain factor of the controller; $\rho(t)$ represents a health coefficient of the driver, $\varepsilon(t)$ represents an interference factor of the driver; $e((\text{or } e(\bullet))$ represents a dynamic error of the system ($e(\bullet)$ is written as $e$ for simplification in subsequent derivation), $\ddot{e}$ represents the second derivative of the dynamic error, wherein $x_1 = q$ represents a motion trajectory of the joint robot, $\ddot{x}_1$ represents an acceleration of the joint robot motion, $q^*$ represents a given joint tracking trajectory; $\ddot{q}^*$ represents an acceleration of the given joint tracking $F(\bullet) = D_q^{-1}(q)(C_q(q)\dot{q} + G_q(q))$, and $Q(x_1,t) = D_q^{-1}(q)\tau(\dot{q},t)$.

3) Designing a PID controller and updating algorithms of the joint robot system:

The PID controller $v$ is expressed as $$v = -(k_{D0} + \Delta k_D(t))\left(2\gamma e(\bullet) + \gamma^2 \int_0^t e(\bullet)d\tau + \frac{de(\bullet)}{dt}\right)$$

Wherein $\gamma$ is a parameter that a designer can design at will, and $k_{D0}$ is a constant that is designed at the designer's option;

Wherein the updating algorithms consist of two algorithms as follows:

(1) Algorithm based on the robust adaptive control:

The robust adaptive algorithm is designed for automatically updating the controller parameters at an updating rate of:

$$\Delta k_D(t) = \hat{c}\varphi_0^2(\bullet)$$

$$\begin{cases} \dot{\hat{c}} = -\sigma_0\hat{c} + \sigma_1\varphi_0^2(\bullet)\|E\|^2 \\ \hat{c}(0) \geq 0 \end{cases}$$

Wherein, $\sigma_0$ and $\sigma_1$ are positive constants that the designer needs to design;

$$\begin{cases} c = \max\left\{a_1, \frac{1}{2}\gamma_d\right\} \\ \varphi_0(\bullet) = \varphi_1(\bullet) + \|\dot{q}\|\|E\| \end{cases},$$

wherein $\hat{c}$ is an estimated value of $c$; $a_1 = \max\{\gamma_d a_f, \gamma_d \gamma^2, 2\gamma_d\gamma,\gamma_d\bar{x}_2\}$, $\varphi_1(\bullet) = \varphi_f(\bullet) + \|e\| + \|\dot{e}\| + 1$, wherein $a_f\varphi_f(\bullet)$ is a product of the constant $a_f$ and the scalar function $\varphi_f(\bullet)$, representing the upper bound of the system uncertainty factor $D_q^{-1}(q)[\rho(t)\Gamma(0) + \rho(t)\varepsilon(v) + \varepsilon(t)] + F(\bullet) + Q(x_1,t) - \ddot{q}^*$, $\bar{x}_2$ is the upper bound of an second derivative $\ddot{q}^*$ of a given joint motion trajectory, $\gamma_d$ is the upper bound of an system parameter $D_q(q)$, and it is set that $$E = 2\gamma e(\bullet) + \gamma^2 \int_0^t e(\bullet)d\tau + \frac{de(\bullet)}{dt};$$

(2) Algorithm based on the neural adaptive control:

The neural adaptive algorithm is designed for automatically updating the controller parameters at an updating rate of:

$$\begin{cases} \dot{\hat{b}} = -\theta_0 \hat{b} + \theta_1 \psi^2(\cdot)\|E\|^2 \\ \hat{b}(0) \geq 0 \end{cases}$$

$$\Delta k_D(t) = \hat{b}\psi^2(\cdot)$$

Wherein: $\theta_0$ and $\theta_1$ are positive constants that the designer needs to design; $\psi(\cdot)=\|S(\cdot)\|+1$, wherein $S(\cdot)$ is a primary function of a neural network, $S(\cdot)$ and a number of neurons are determined at the designer's will; $b=\max\{\|W^T\|,m\}$, wherein $\hat{b}$ is an estimated value of b, $W^T$ is an ideal unknown weight, and m is the upper limit of an reconstruction error $\|\eta(\cdot)\|$ of the model;

$$E = 2\gamma e(\cdot) + \gamma^2 \int_0^t e(\cdot)d\tau + \frac{de(\cdot)}{dt};$$

4) Using the PID controller and the updating algorithms designed in step 3) for the joint robot system to control the trajectory motion of the joint robot.

The present disclosure is beneficial in:

The present disclosure provides a neural network adaptive tracking control method for joint robots, wherein algorithms based on robust adaptive control and neural adaptive control are respectively designed against a joint robot system troubled with declining and drive saturation, which are formed in a simple way of PID, have an advantage of low complexity, and may solve the following technical problems at the same time: the drive saturation and coupling effect in the joint system, processing parameter uncertainty and non-parametric uncertainty, execution failure handling during the system operation, compensation for non-vanishing interference, and the like. Also, the present disclosure is robust to external interference, adaptive to nonparametric uncertainty, and fault-tolerant to unpredictable drive failures.

DETAILED DESCRIPTION

Figure 1:
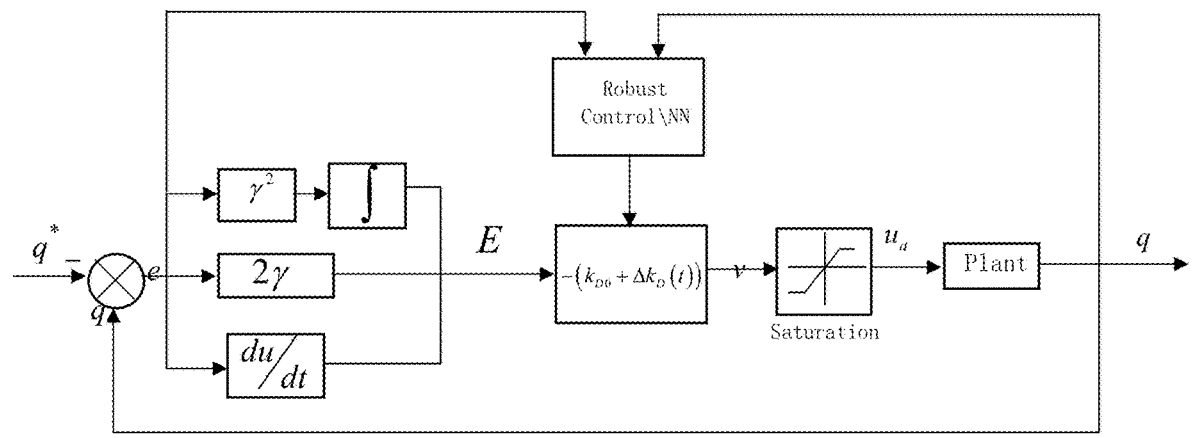
FIG. 1 is a block diagram of the algorithm design control of the system. According to the present disclosure, the controller gain is adaptively adjusted by using the robust adaptive algorithm and the neural adaptive algorithm respectively, so that the joint motion trajectory of the controlled robot reaches an ideal trajectory.
Figure 2:
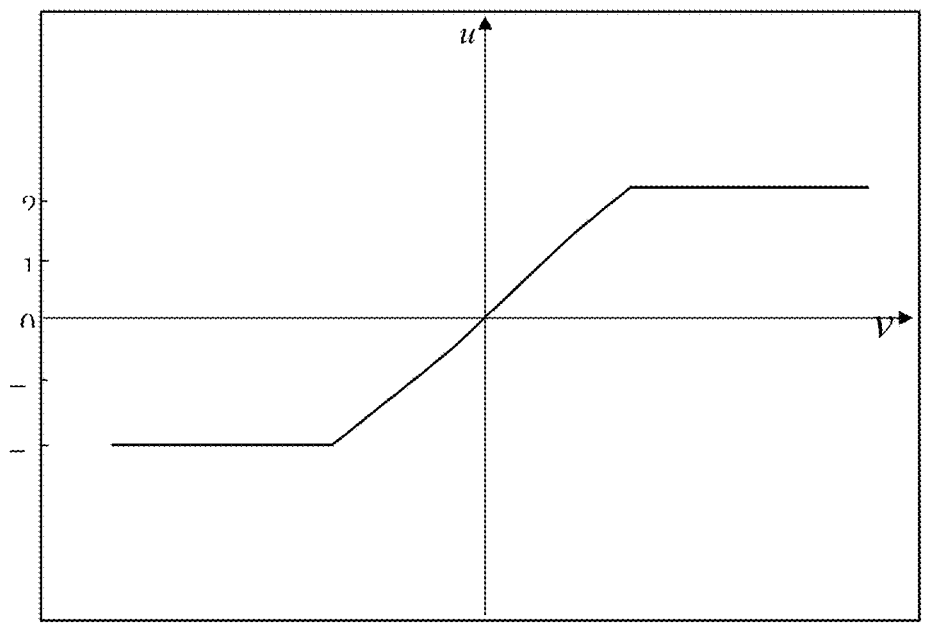
FIG. 2 is a schematic diagram of actuator saturation, which includes an asymmetric and non-smooth saturation function and a smooth approximation function, and when v reaches a certain value, the controller input u will reach a saturation status.
Figure 3:
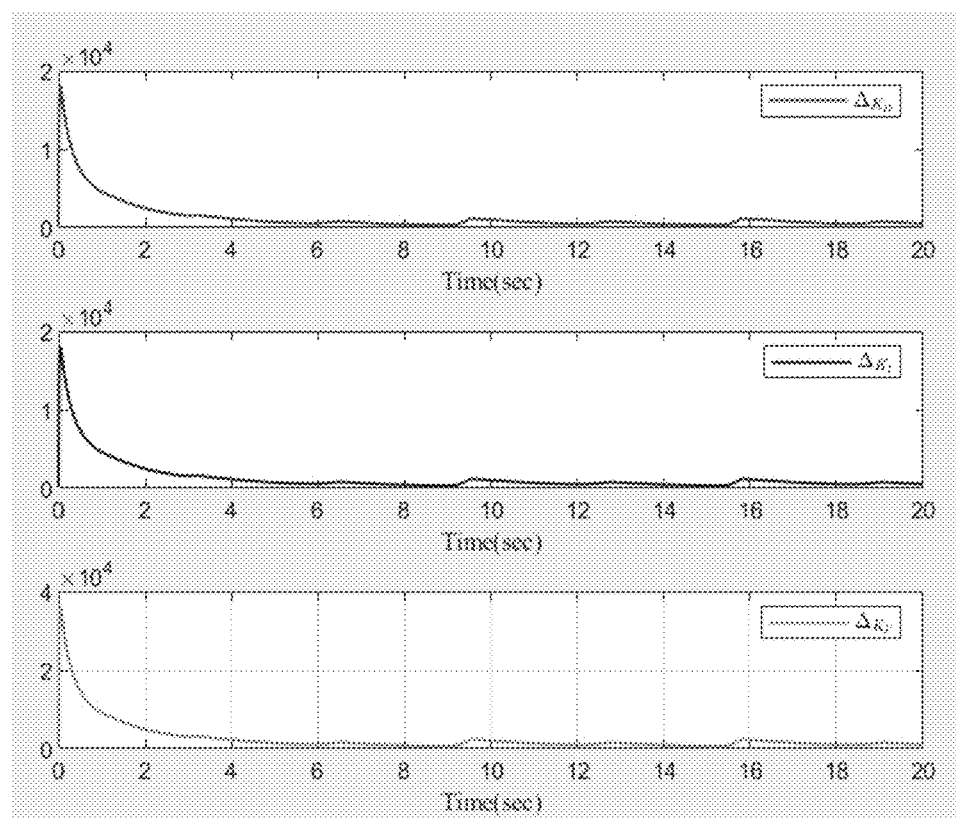
FIGS. 3 and 4 are respectively a simulation diagram of controller gain adjustment and a joint robot position tracking curve, which both adopt the robust adaptive control method in the embodiment to carry out the simulation control, wherein $\Delta k_P$, $\Delta k_I$, $\Delta k_D$ respectively represent changes of three time-varying gains of the PID controller, and $e_1$, $e_2$, and $e_3$ respectively represent the trajectory errors of three joint motions of the robot.
Figure 4:
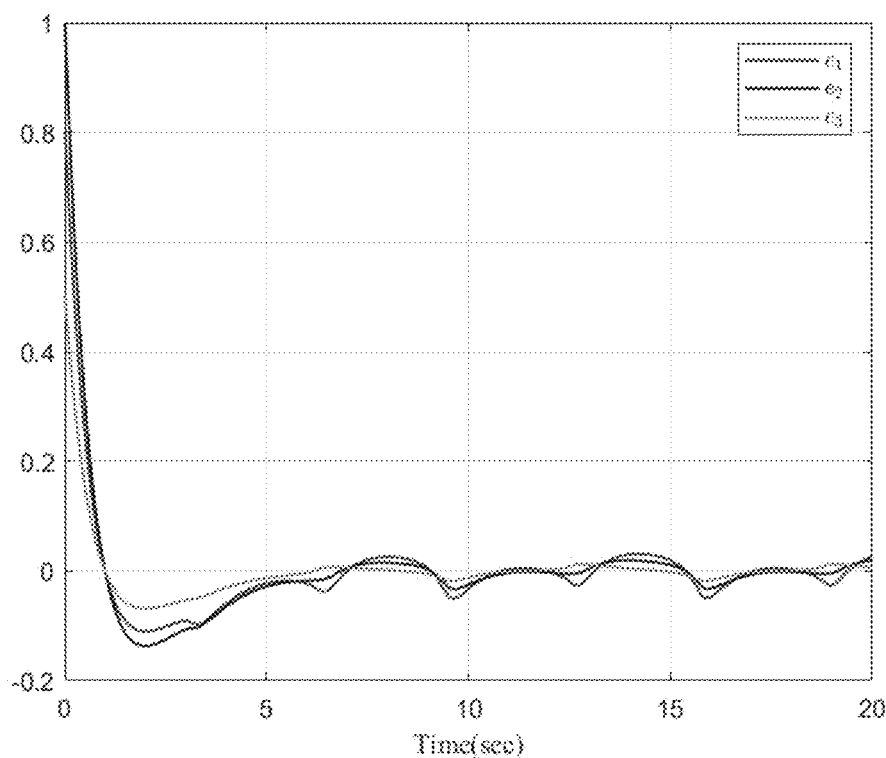
Figure 5:
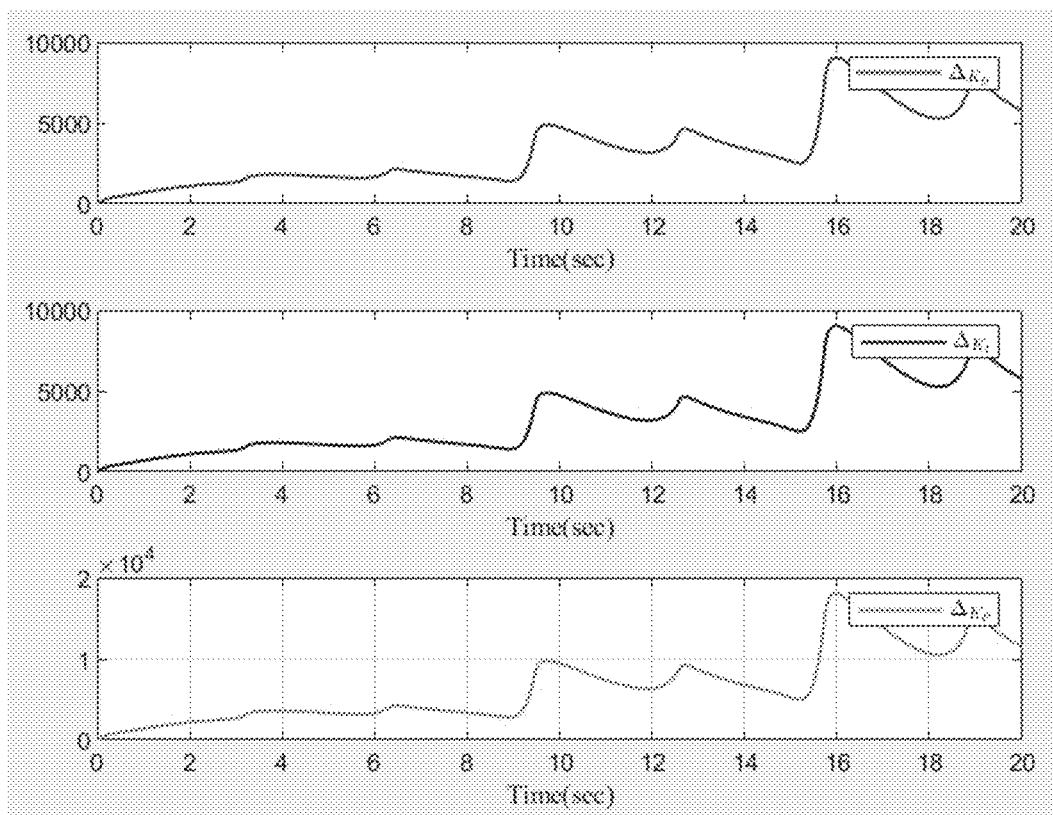
FIGS. 5 and 6 are respectively a simulation diagram of controller gain adjustment and a joint robot position tracking curve, which both adopt the neural adaptive control method in the embodiment to carry out the simulation control, wherein $\Delta k_P$, $\Delta k_I$, $\Delta k_D$ respectively represent changes of three time-varying gains of the PID controller, and $e_1$, $e_2$, and $e_3$ respectively represent the trajectory errors of three joint motions of the robot.
Figure 6:
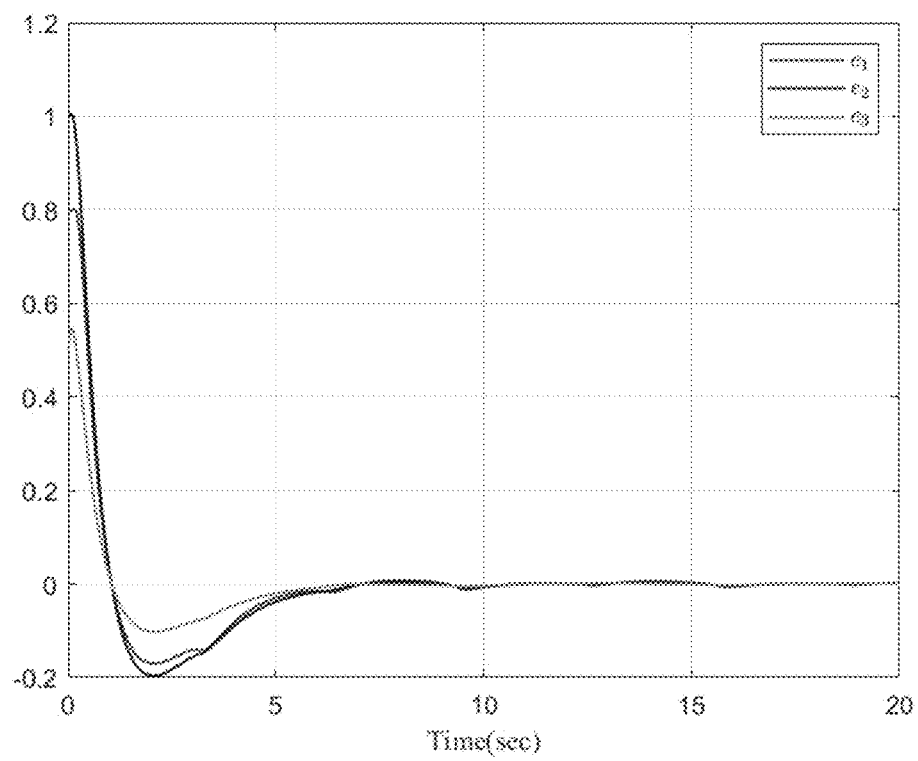
Figure 7:
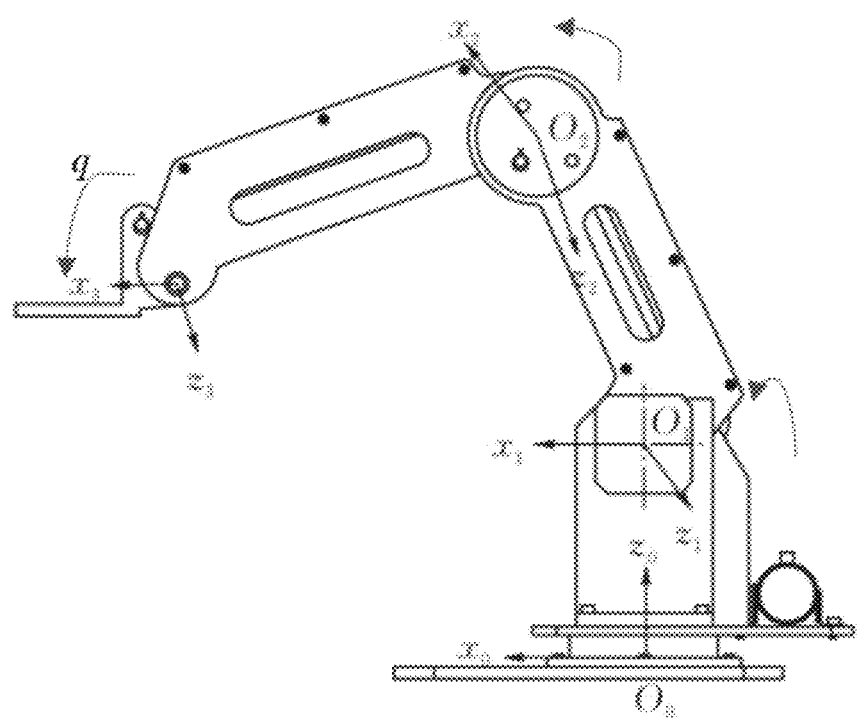
FIG. 7 is a diagram of the joint robot model.

The present disclosure will be further described with reference to figures and embodiments below to enable the implementation by those skilled in the art according to the text of the specification.

In this embodiment, the neural network adaptive tracking control method for joint robots, including the following steps:

1) Establishing a joint robot system model:

$$D_q(q)\ddot{q}+C_q(q,\dot{q})\dot{q}+G_q(q)+\tau(\dot{q},t)=u_a$$

In the model mentioned above, q represents a position vector of the joint robot, $\dot{q}$ represents a velocity vector of the joint robot, $\ddot{q}$ represents an acceleration vector of the joint robot action, $u_a$ represents a control input of the joint robot system, the system parameter $D_q(q)$ represents an inertia matrix of the joint robot system, the system parameter $C_q(q,\dot{q})$ represents a centrifugal matrix of the joint robot system, the system parameter $G_q(q)$ represents a universal gravitation matrix of the joint robot system, and the system parameter $\tau(\dot{q},t)$ represents uncertainty and interference factors of the joint robot system;

2) Establishing a state space expression and an error definition when taking into consideration both the drive failure and actuator saturation of the joint robot system:

$$u_a(t)=\rho(t)[\Gamma(0)+L(\xi)v+\varepsilon(v)]+\varepsilon(t)=\rho(t)L(\xi)v+[\rho(t)\Gamma(0)+\rho(t)\varepsilon(v)+\varepsilon(t)]$$

$$e=x_1-q^*$$

$$\ddot{e}=\ddot{x}_1-\ddot{q}^*=D_q^{-1}(q)\rho(t)L(\xi)v+D_q^{-1}(q)[\rho(t)\Gamma(0)+\rho(t)\varepsilon(v)+\varepsilon(t)]+F(\cdot)+Q(x_1,t)-\ddot{q}^*$$

In the above formulas, $u_a(t)$ represents a system control input signal considering both drive failure and actuator saturation, $\Gamma(0)+L(\xi)v+\varepsilon(v)$, represents a control signal in the case of actuator saturation, wherein v represents an actual controller design quantity of the system, $\Gamma(0)+L(\xi)v$ represents a smooth function proposed according to the mean value theorem of v, $\Gamma(0)$ is a bounded matrix, $L(\xi)$ is a non-negative positive definite matrix, $\varepsilon(v)$ is a bounded approximate error and represents an uncertain factor of the controller; $\rho(t)$ represents a health coefficient of the driver, $\varepsilon(t)$ represents an interference factor of the driver; $e((or\ e\cdot))$ represents a dynamic error of the system ($e(\cdot)$ is written as e for simplification in subsequent derivation), ë represents the second derivative of the dynamic error, wherein $x_1=q$ represents a motion trajectory of the joint robot, $\ddot{x}_1$ represents an acceleration of the joint robot motion, $q^*$ represents a given joint tracking trajectory; $\ddot{q}^*$ represents an acceleration of the given joint tracking $F(\cdot)=D_q^{-1}(q)(C_q(q)\dot{q}+G_q(q))$, and $Q(x_1,t)=D_q^{-1}(q)\tau(\dot{q},t)$. The nonlinearity and uncertainty factors in the system set may be determined by the upper bound of the product of a constant and a scalar real-valued function, so as to obtain a robust adaptive control scheme; or the system is reconstructed through a neural network based on a radial primary function so as to produce the neural network adaptive control scheme.

3) Designing a PID controller and updating algorithms of the joint robot system:

The PID controller ν is expressed as $$v = -(k_{D0} + \Delta k_D(t))\left(2\gamma e(\cdot) + \gamma^2 \int_0^\tau e(\cdot)d\tau + \frac{de(\cdot)}{dt}\right)$$

Wherein γ is a parameter that the designer can design at will, and $k_{D0}$ is a constant that is designed at the designer's option;

Wherein the updating algorithms consist of two algorithms as follows:

(1) Algorithm based on the robust adaptive control:

The robust adaptive algorithm is designed for automatically updating the controller parameters at an updating rate of:

$$\Delta k_D(t) = \hat{c}\varphi_0^2(\cdot)$$

$$\begin{cases} \dot{\hat{c}} = -\sigma_0\hat{c} + \sigma_1\varphi_0^2(\cdot)\|E\|^2 \\ \hat{c}(0) \geq 0 \end{cases}$$

Wherein, $\sigma_0$ and $\sigma_1$ are positive constants that the designer needs to design;

$$\begin{cases} c = \max\left\{a_1, \frac{1}{2}\gamma_d\right\} \\ \varphi_0(\cdot) = \varphi_1(\cdot) + \|\dot{q}\|\|E\| \end{cases},$$

wherein $\hat{c}$ is an estimated value of c; $a_1$=max $\{\gamma_d a_f, \gamma_d\Gamma^2, 2\gamma_d\gamma,\gamma_d\bar{x}_2\}$, $\varphi_1(\cdot)=\varphi_f(\cdot)+\|e\|+\|\dot{e}\|+1$, wherein $a_f\varphi_f(\cdot)$ is a product of the constant $a_f$ and the scalar function $\varphi_f(\cdot)$, representing the upper bound of the system uncertainty factor $D_q^{-1}(q)[\rho(t)\Gamma(0)+\rho(t)\varepsilon(v)+\varepsilon(t)]+F(\cdot)+Q(x_1,t)-\dot{q}^*$, $\bar{x}_2$ is the upper bound of an second derivative $\ddot{q}^*$ of a given joint motion trajectory, $\gamma_d$ is the upper bound of an system parameter $D_q(q)$, and it is set that $$E = 2\gamma e(\cdot) + \gamma^2 \int_0^\tau e(\cdot)d\tau + \frac{de(\cdot)}{dt};$$

(2) Algorithm based on the neural adaptive control:

The neural adaptive algorithm is designed for automatically updating the controller parameters at an updating rate of:

$$\begin{cases} \dot{\hat{b}} = -\theta_0\hat{b} + \theta_1\psi^2(\cdot)\|E\|^2 \\ \hat{b}(0) \geq 0 \end{cases}$$

$$\Delta k_D(t) = \hat{b}\psi^2(\cdot)$$

Wherein: $\theta_0$ and $\theta_1$ are positive constants that the designer needs to design; $\psi(\cdot)=\|S(\cdot)\|+1$, wherein $S(\cdot)$ is a primary function of a neural network, $S(\cdot)$ and a number of neurons are determined at the designer's will; b=max$\{\|W^T\|,m\}$, wherein $\hat{b}$ is an estimated value of b, $W^T$ is an ideal unknown weight, and m is the upper limit of an reconstruction error $\|\eta(\cdot)\|$ of the model;

$$E = 2\gamma e(\cdot) + \gamma^2 \int_0^\tau e(\cdot)d\tau + \frac{de(\cdot)}{dt};$$

4) Using the PID controller and the updating algorithms designed in step 3) for the joint robot system to control the trajectory motion of the joint robot.

A detailed description will be provided below for the derivation processes of the PID controller and the updating algorithms designed in this embodiment.

A generalized error E is assumed to simplify the stability analysis of the PID controller, so we have $$E = 2\gamma e(\cdot) + \gamma^2 \int_0^\tau e(\cdot)d\tau + \frac{de(\cdot)}{dt}$$

$$D_q(q)\dot{E} = \rho(t)L(\xi)v + [\rho(t)\Gamma(0) + \rho(t)\varepsilon(v) + r(t)] + D_q(q)F(\cdot) +$$
$$D_q(q)Q(x_1, t) + D_q(q)(\gamma^2 e + 2\gamma\dot{e} - \ddot{q}^*) = J(x_1, t)v + I(x_1, t)$$

Wherein: $J(x_1,t)=\rho(t)L(\xi)$, $I(x_1,t)=[\rho(t)\Gamma(0)+\rho(t)\varepsilon(v)+r(t)]+D_q(q)F(\cdot)+D_q(q)Q(x_1,t)+D_q(q)(\gamma^2 e+2\gamma\dot{e}=\ddot{q}^*)$ To simplify the control design and stability analysis, the function is defined as follows:

$\Psi(\cdot)=I(x_1,t)+\frac{1}{2}D_q\dot{E}$ (1) Algorithm based on the robust adaptive control:

The nonlinearity and uncertainty factors in the system set may be determined by the upper bound of the product of a constant and a scalar real-valued function like:

$I(x_1,t) \leq \gamma_d a_f \varphi_f(\cdot) = \gamma_d\gamma^2 e+2\gamma_d\gamma\dot{e}-\gamma_d\ddot{q}^* \leq a_1\varphi_1(\cdot)$ Wherein, $\gamma_d$ is the upper bound of the system parameter $D_q$, $a_f\varphi_f(\cdot)$ is the upper bound of the system uncertainty factor $D_q^{-1}[\rho(t)\Gamma(0)+\rho(t)\varepsilon(v)+\varepsilon(t)]+F(\cdot)+Q(x_1,t)-\dot{q}^*$, and $$\begin{cases} a_1 = \max\{\gamma_d a_f, \gamma_d\gamma^2, 2\gamma_d\gamma, \gamma_d\bar{x}_2\} \\ \varphi_1(\cdot) = \varphi_f(\cdot) + \|e\| + \|\dot{e}\| + 1 \end{cases}$$

So that $\Psi(\cdot) \leq a_1\varphi_1(\cdot)+\frac{1}{2}\gamma_d\|\dot{q}\|\|E\| \leq c\varphi_0(\cdot)$ Wherein $$\begin{cases} c = \max\left\{a_1, \frac{1}{2}\gamma_d\right\} \\ \varphi_0(\cdot) = \varphi_1(\cdot) + \|\dot{q}\|\|E\| \end{cases}$$

Therefore, the robust adaptive algorithm is designed for automatically updating the controller parameters at an updating rate of:

$$\Delta k_D(t) = \hat{c}\varphi_0^2(\cdot)$$

$$\begin{cases} \dot{\hat{c}} = -\sigma_0\hat{c} + \sigma_1\varphi_0^2(\cdot)\|E\|^2 \\ \hat{c}(0) \geq 0 \end{cases}$$

Wherein $\sigma_0$ and $\sigma_1$ are positive constants that the designer needs to design; and $\tilde{c}=c-\hat{c}$ is selected as the error value of c.

Based on the design of the above controller and the selection of the update rate, by selecting the Lyapunov function $$V = \frac{1}{2}E^T D_q E + \frac{1}{2\sigma_1}\tilde{c}^2$$

to correspondingly verify and analyze the designed controller, it can be proved that under the effect of the designed controller, all signals in the joint robot system will eventually converge to a global scope, thus ensuring that the tracking error of the system is globally consistent and bounded.

(3) Algorithm based on the neural adaptive control:

The system is reconstructed against the uncertainty factor of the function defined above by using the way of a neural network adaptive approximation, wherein it is set that $$\Psi(\cdot)=W^T S(\cdot)=\eta(\cdot)$$

Wherein the primary function $S(\cdot)$ and the number of neurons of the neural network are determined at the designer's will, so they satisfy $$\|\Psi(\cdot)\| \leq \|W^T\|\|S(\cdot)\| + \|\eta(\cdot)\| \leq \|W^T\|\|S(\cdot)\| + m \leq b\psi(\cdot)$$

Wherein $$\psi(\cdot)=\|S(\cdot)\|+1$$

$$b=\max\{\|W^T\|,m\}$$

$\|\eta(\cdot)\|\leq m, \|W^T\|\leq b$, taking the time-varying nature of system parameters and the unknown weight of the system into consideration, we have chosen the estimated parameter b for design and system analysis, so that the design update rate is:

$$\begin{cases} \dot{\hat{b}} = -\sigma_0 \hat{b} + \sigma_1 \varphi^2(\cdot)\|E\|^2 \\ \hat{b}(0) \geq 0 \end{cases}$$

$$\Delta k_D(t) = \hat{b}\varphi^2(\cdot)$$

Wherein $\theta_0$ and $\theta_1$ are positive constants that the designer needs to design; and $\tilde{b}=b-\hat{b}$ is selected as the error value of b Based on the design of the above controller and the selection of the update rate, by selecting the Lyapunov function $$V = \frac{1}{2}E^T D_q E + \frac{1}{2\theta_1}\tilde{b}^2$$

to correspondingly verify and analyze the designed controller, it can be proved that under the effect of the designed controller, all signals in the system will eventually converge to a global scope, thus ensuring that the tracking error of the system is bounded, globally consistent and bounded.

The neural network adaptive tracking control method for joint robots provided in this embodiment may ensure that the system perfectly tracks the ideal trajectory in the case of drive failure and drive saturation, and at the same time realize the bounded tracking error. Compared with traditional PID controllers, this controller is relatively simple in structure, which may handle the drive saturation and coupling effect in the joint system to a better extent, the parameter uncertainty and non-parametric uncertainty, and the execution failure during the system running. In addition, this controller may compensate the non-vanishing interference, thereby greatly reducing the complexity of control algorithms in the prior art.

Finally, it is noted that the above embodiments are only for the purpose of illustrating the technical scheme of the present disclosure without limiting it. Although a detailed specification is given for the present disclosure by reference to preferred embodiments, those of ordinary skills in the art should understand that the technical schemes of the present disclosure can be modified or equivalently replaced without departing from the purpose and scope of the technical schemes thereof, which should be included in the scope of claims of the present disclosure.

What is claimed is:

1. A neural network adaptive tracking control method for joint robots, comprising:
   1) Establishing a joint robot system model:

$$D_q(q)\ddot{q}+C_q(q,\dot{q})\dot{q}+G_q(q)+\tau(\dot{q},t)=u_a$$

in the model mentioned above, q represents a position vector of the joint robot, $\dot{q}$ represents a velocity vector of the joint robot, $\ddot{q}$ represents an acceleration vector of a joint robot action, $u_a$ represents a control input of the joint robot system, the system parameter $D_q(q)$ represents an inertia matrix of the joint robot system, the system parameter $C_q(q, \dot{q})$ represents a centrifugal matrix of the joint robot system, the system parameter $G_q(q)$ represents a universal gravitation matrix of the joint robot system, and the system parameter $\tau(\dot{q}, t)$ represents uncertainty and interference factors of the joint robot system;

2) establishing a state space expression and an error definition when taking into consideration both a drive failure and actuator saturation of the joint robot system:

$$u_a(t)=\rho(t)[\Gamma(0)+L(\xi)v+\varepsilon(v)]+\varepsilon(t)=\rho(t)L(\xi)v+[\rho(t)\Gamma(0)+\rho(t)\varepsilon(v)+\varepsilon(t)]$$

$$e=x_1-q^*$$

$$\ddot{e}=\ddot{x}_1-\ddot{q}^*=D_q^{-1}(q)\rho(t)L(\xi)v+D_q^{-1}(q)[\rho(t)\Gamma(0)+\rho(t)\varepsilon(v)+\varepsilon(t)]+F(\cdot)+Q(x_1,t)-\ddot{q}^*$$

in the above formulas, $u_a(t)$ represents a system control input signal considering both drive failure and actuator saturation, $\Gamma(0)+L(\tau)v+\varepsilon(v)$ represents a control signal in a case of actuator saturation, wherein v represents an actual controller design quantity of the system, $\Gamma(0)+L(\xi)v$ represents a smooth function proposed according to a mean value theorem of v, $\Gamma(0)$ is a bounded matrix, $L(\xi)$ is a non-negative positive definite matrix, $\varepsilon(v)$ is a bounded approximate error and represents an uncertain factor of a controller; $\rho(t)$ represents a health coefficient of a driver, $\varepsilon(t)$ represents an interference factor of the driver; e(or $e(\cdot)$) represents a dynamic error of the system ($e(\cdot)$ is written as e for simplification in subsequent derivation), $\ddot{e}$ represents the second derivative of the dynamic error, wherein $x_1=q$ represents a motion trajectory of the joint robot, $\ddot{x}_1$ represents an acceleration of the joint robot motion, $q^*$ represents a given joint tracking trajectory; $\ddot{q}^*$ represents an acceleration of the given joint tracking, $F(\cdot)=-D_q^{-1}(q)(C_q(q)\dot{q}+G_q(q))$, and $Q(x_1, t)=-D_q^{-1}(q)\tau(\dot{q}, t)$;

3) designing a proportion integration differentiation (PID) controller and updating algorithms of the joint robot system:

the PID controller $v$ is expressed as $$v = -(k_{D0} + \Delta k_D(t))\left(2\gamma e(\cdot) + \gamma^2 \int_0^\tau e(\cdot)d\tau + \frac{de(\cdot)}{dt}\right)$$

wherein $\gamma$ is a predetermined parameter, and $k_{D0}$ is a constant;

wherein the updating algorithms consist of two algorithms as follows:

(1) algorithm based on a robust adaptive control:

the robust adaptive algorithm is designed for automatically updating the controller parameters at an updating rate of:

$$\Delta k_D(t) = \hat{c}\varphi_0^2(\cdot)$$

$$\begin{cases} \dot{\hat{c}} = -\sigma_0 \hat{c} + \sigma_1 \varphi_0^2(\cdot)\|E\|^2 \\ \hat{c}(0) \geq 0 \end{cases}$$

wherein, $\sigma_0$ and $\sigma_1$ are positive constants;

$$\begin{cases} c - \max\left\{a_1, \frac{1}{2}\gamma_d\right\} \\ \varphi_0(\cdot) = \varphi_1(\cdot) + \|\dot{q}\|\|E\| \end{cases},$$

wherein $\hat{c}$ is an estimated value of c;

$a_1 = \max \{\gamma_d a_f, \gamma_d \gamma^2, 2\gamma_d \gamma \cdot \gamma_d \bar{x}_2\}$, $\varphi_1(\cdot) = \varphi_f(\cdot) + \|e\| + \|\dot{e}\| + 1$, wherein $a_f \varphi_f(\cdot)$ is a product of a constant $a_f$ and a scalar function $\varphi_f(\cdot)$, representing the upper bound of the system uncertainty factor $D_q^{-1}(q)[\rho(t)\Gamma(0) + \rho(t)\varepsilon(v) + \varepsilon(t)] + F(\cdot) + Q(x_1, t) - \ddot{q}^*$, $\bar{x}_2$ is the upper bound of an second derivative $\ddot{q}^*$ of a given joint motion trajectory, $\gamma_d$ is the upper bound of an system parameter $D_q(q)$, and it is set that $$E = 2\gamma e(\cdot) + \gamma^2 \int_0^\tau e(\cdot)d\tau + \frac{de(\cdot)}{dt};$$

(2) algorithm based on a neural adaptive control:

the neural adaptive algorithm is designed for automatically updating the controller parameters at an updating rate of:

$$\begin{cases} \dot{\hat{b}} = -\sigma_0 \hat{b} + \sigma_1 \varphi^2(\cdot)\|E\|^2 \\ \hat{b}(0) \geq 0 \end{cases}$$

$$\Delta k_D(t) = \hat{b}\varphi^2(\cdot)$$

wherein: $\theta_0$ and $\theta_1$ are positive constants;

$\Psi(\cdot) = \|S(\cdot)\| + 1$, wherein $S(\cdot)$ is a primary function of a neural network; $b = \max\{\|W^T\|, m\}$, wherein $\hat{b}$ is an estimated value of b, $W^T$ is an ideal unknown weight, and m is the upper limit of an reconstruction error $\|\eta(\cdot)\|$ of the model;

$$E = 2\gamma e(\cdot) + \gamma^2 \int_0^\tau e(\cdot)d\tau + \frac{de(\cdot)}{dt};$$

4) controlling trajectory motion of the joint robot by using the PID controller and the updating algorithms designed in step 3) for the joint robot system.

* * * * *